United States Patent
Beesley

(10) Patent No.: US 9,682,828 B2
(45) Date of Patent: Jun. 20, 2017

(54) ACCUMULATION DEVICE AND TRANSFER DEVICE FOR SAME

(71) Applicant: ILLINOIS TOOL WORKS INC., Glenview, IL (US)

(72) Inventor: Robert C. Beesley, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/075,280

(22) Filed: Mar. 21, 2016

(65) Prior Publication Data

US 2016/0325943 A1  Nov. 10, 2016

Related U.S. Application Data

(60) Provisional application No. 62/158,056, filed on May 7, 2015.

(51) Int. Cl.
| | |
|---|---|
| B65G 21/10 | (2006.01) |
| B65G 37/00 | (2006.01) |
| B65G 47/51 | (2006.01) |
| B65G 43/10 | (2006.01) |
| B65G 47/26 | (2006.01) |

(52) U.S. Cl.
CPC ......... B65G 47/5131 (2013.01); B65G 37/00 (2013.01); B65G 43/10 (2013.01); B65G 47/268 (2013.01)

(58) Field of Classification Search
CPC ........ B65G 47/10; B65G 37/00; B65G 47/51; B65G 47/5131; B65G 47/52
USPC .............. 198/370.01, 480.1, 594, 602, 347.1
See application file for complete search history.

(56) References Cited

U.S. PATENT DOCUMENTS

| | | | | |
|---|---|---|---|---|
| 6,152,291 A * | 11/2000 | Steeber | .............. | B65G 47/5131 198/594 |
| 6,230,874 B1 * | 5/2001 | Steeber | .................. | B65G 15/60 198/457.06 |
| 6,260,688 B1 * | 7/2001 | Steeber | .................. | B65G 21/18 198/347.4 |
| 6,382,398 B2 * | 5/2002 | Steeber | .................. | B65G 21/18 198/594 |
| 6,497,321 B2 * | 12/2002 | Horton | ............... | B65G 47/5131 198/594 |
| 6,523,669 B1 * | 2/2003 | Steeber | .............. | B65G 47/5131 198/370.01 |

(Continued)

FOREIGN PATENT DOCUMENTS

WO  WO 2005/102880  11/2005

OTHER PUBLICATIONS

International Search Report for International Application No. PCT/US2016/029994, dated Jul. 14, 2016.

*Primary Examiner* — James R Bidwell
(74) *Attorney, Agent, or Firm* — JK Intellectual Property Law, PA

(57) ABSTRACT

An apparatus for controlling the flow of articles and a related transfer device are provided for transferring flow between a first conveyor drivable in a first direction and a second conveyor drivable in a second opposite direction. The first and second conveyors may have at least one curved portion, and a transfer device is movable along the first and second conveyors. The transfer device has a pivotable frame and a movable guide to lengthen a transfer path when in the curved portion.

22 Claims, 12 Drawing Sheets

(56) References Cited

U.S. PATENT DOCUMENTS

| | | | | |
|---|---|---|---|---|
| 6,698,581 B2* | 3/2004 | Duterte | ............ | B65G 47/5131 |
| | | | | 198/370.01 |
| 7,032,742 B2* | 4/2006 | Hartness | ............ | B65G 47/5131 |
| | | | | 198/347.3 |
| 7,191,896 B2* | 3/2007 | Hartness | ............ | B65G 47/5131 |
| | | | | 198/347.3 |
| 9,174,806 B2* | 11/2015 | Broers | ............ | B65G 47/5131 |
| 2001/0054540 A1 | 12/2001 | Steeber | | |
| 2002/0125107 A1* | 9/2002 | Horton | ............ | B65G 47/5131 |
| | | | | 198/594 |
| 2003/0019726 A1 | 1/2003 | Hartness | | |
| 2003/0178284 A1 | 9/2003 | Steeber | | |

* cited by examiner

ACCUMULATION DEVICE AND TRANSFER DEVICE FOR SAME

CROSS-REFERENCE TO RELATED APPLICATIONS

This application is a United States Non-Provisional patent application, claiming benefit to U.S. Provisional Patent Application Ser. No. 62/158,056, filed May 7, 2015 which is incorporated by reference herein.

TECHNICAL FIELD

The present disclosure relates to an accumulation device having oppositely-running conveyors, and to a transfer device movable along the conveyors for transferring articles between the conveyors.

BACKGROUND

There are many arrangements wherein conveyors buffer flow of articles through a system. One common use is in systems for filling liquid containers such as bottles, cans or boxes. In such systems, to achieve first-in/first-out flow, an accumulator with oppositely-running conveyors can be located between an upstream station (e.g., a filler) and a downstream station (e.g. a capper). The conveyors may be straight and horizontal, and may be in the form of "mass-flow, linear" conveyors. Alternatively, the conveyors may be curved and non-horizontal, and may be in the form of "single-file, helical" conveyors. One of the conveyors (e.g., an infeed conveyor) receives articles from the system and the other conveyor (e.g., an outfeed conveyor) returns articles to the system. A transfer device moves articles from the infeed conveyor to the outfeed conveyor. Articles thus flow from the system, through the infeed conveyor, transfer device, and outfeed conveyor, and then back to the system.

When the upstream and downstream stations run at the same speed (in terms of articles per minute, for example), the accumulator generally operates in a steady state. When the infeed and outfeed conveyors are moved at the same speed and the transfer device is stationary. If the downstream station slows or stops, the device leaves steady state. The outfeed conveyor slows or stops accordingly, while the infeed conveyor continues and the transfer device moves so that more articles enter the accumulator. As long as the downstream station returns to service before the accumulator is filled, then the overall system need not be stopped or slowed. Similarly, if the upstream device slows or stops, the infeed conveyor slows or stops accordingly, and the outfeed conveyor continues at full speed as long as a supply of articles is available in the accumulator. As long as the upstream device returns to service before the accumulator is emptied, then the overall system need not be stopped or slowed.

Many of such accumulator devices have been successfully deployed. In particular, Applicant has commercially introduced, and is owner of U.S. patents on, various types of mass-flow and single file accumulators under the DYNAC® name. For example, U.S. Pat. Nos. 6,382,398 and 6,497,321 disclose respectively horizontal, mass-flow and helical, single-file accumulators. U.S. Pat. No. 6,698,581 also discloses a helical, single file accumulator, as well as aspects of designs for a device for transferring articles from an infeed conveyor to an outfeed conveyor. The transfer device is driven along the infeed and outfeed conveyors when the conveyors are running at different speeds to accumulate or de-accumulate articles on the conveyors as dictated by the system in which the accumulator is placed.

The devices and systems introduced by Applicant and disclosed in the above patents provide exemplary operation in their intended systems. However, further improvement would be welcome, in particular in providing designs for higher speed accumulators, transfer devices and systems, in which operational throughput of articles is increased, or in providing designs capable of handling articles of different dimensions, with less adjustment or changeout of parts.

SUMMARY

It is therefore an objective of the present disclosure to provide an accumulator, transfer device and system for buffering articles that addresses or improves upon one or more aspects of the above devices or other devices. Additional objectives and advantages of the disclosure will be set forth in part in the following description, may be obvious from the description, or may be learned through practice of the disclosure.

According to certain aspects of the disclosure, an apparatus for controlling the flow of articles may include a first conveyor drivable in a first direction to convey articles in the first direction and a second conveyor substantially parallel to the first conveyor and drivable in a second direction opposite to the first direction to convey articles in the second direction. The first and second conveyors may have at least one curved portion. A transfer device is movable along the first and second conveyors, the transfer device having a frame with a first section and a second section pivotally mounted to the first section. The second section is pivotable relative to the first section along the curved portion of the first and second conveyors. A drive member may be rotatably mounted to the frame and drivingly engaged simultaneously by the first and second conveyors. The drive member may be rotated relative to the frame when at least one of the first and second conveyors moves so that the transfer device travels along the first and second conveyors if a relative speed difference exists between the first and second conveyors. An outer guide and an inner guide spaced from the outer guide define between them a transfer path across the frame between the first conveyor and the second conveyor. A movable guide may be mounted to the frame adjacent the outer guide, the movable guide defining an exit portion of the transfer path along the second conveyor and being drivable in a direction to lengthen the transfer path when the curved portion of the first and second conveyors causes a pivoting of the second section relative to the first section. Various options and modifications are possible.

According to other aspects of the disclosure, a transfer device is disclosed for transferring a flow of articles from a first conveyor drivable in a first direction to convey articles in the first direction to a second conveyor substantially parallel to the first conveyor and drivable in a second direction opposite to the first direction to convey articles in the second direction, the first and second conveyors having at least one curved portion, the transfer device including, for example, a frame having a first section and a second section pivotally mounted to the first section. The second section is pivotable relative to the first section along the curved portion of the first and second conveyors. A drive member may be rotatably mounted to the frame and drivingly engaged simultaneously by the first and second conveyors, the drive member being rotated relative to the frame when at least one of the first and second conveyors moves so that the frame travels along the first and second conveyors if a relative speed difference exists between the first and second conveyors. An outer guide and an inner guide spaced from the outer guide define between them a transfer path across the frame between the first conveyor and the second conveyor. A movable guide may be mounted to the frame adjacent the outer guide, the movable guide defining an exit portion of the transfer path along the second conveyor and being drivable in a direction to lengthen the transfer path when the curved portion of the first and second conveyors causes a pivoting of the second section relative to the first section. Again, various options and modifications are possible.

For example, with either of the two aspects above, the outer guide may include a drive belt, and if so the drive belt may be mounted to the frame so as to contact and guide articles from the first conveyor to the second conveyor, the drive belt being driven by the drive member. The drive belt may be driven via the drive member.

The inner guide may be an idler wheel. If so, the idler wheel may be may be mounted to the frame so as to contact and guide articles from the first and second conveyor cooperatively with the outer guide which includes a drive belt, the transfer path defined between the drive belt and the wheel.

The movable guide may include an arcuate plate that engages the articles and guides the articles from the frame to the second conveyor. If so, the arcuate plate may be movable substantially circumferentially around the drive member, and/or the arcuate plate may have a curvature substantially concentric with a circumferential portion of a wheel of the inner guide.

The movable guide may be movable substantially circumferentially around the inner guide, and may define at least one arcuate slot therethrough substantially concentric with a circumferential portion of a wheel of the inner guide. At least one member may be mounted to the first portion of the frame extending through the slot. A mechanism may operationally interconnect the movable guide to the second section of the frame so that pivoting of the second section of the frame relative to the first section causes the movable guide to move by sliding along the slot.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
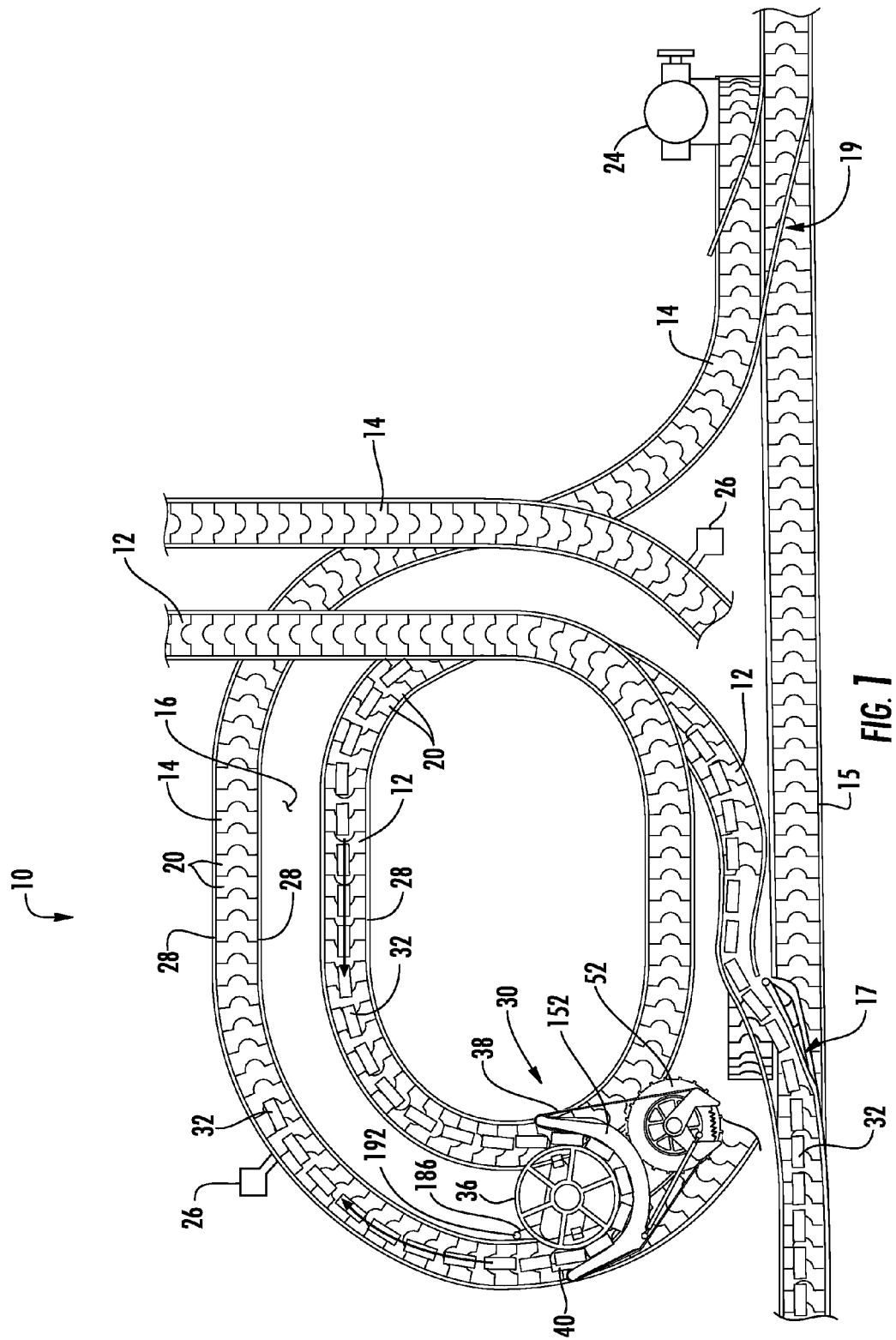
FIG. 1 is top diagrammatical view of one embodiment of an apparatus for controlling flow of articles and a transfer device according to certain aspects of the present disclosure.

Reference will now be made in detail to the presently preferred embodiments of the disclosure, one or more examples of which are illustrated in the drawings. Each example is provided by way of explanation of the disclosure, not meant as a limitation of the disclosure. For example, the features illustrated or described as part of one embodiment may be utilized on another embodiment to yield still a further embodiment. It is intended that the present disclosure include such modifications and variations.

An apparatus, generally 10, according to the disclosure for controlling the flow of articles is illustrated generally in FIG. 1. Apparatus 10 includes a first conveyor 12 that moves in a first direction and a second conveyor 14 that moves in a second opposite direction. The first and second conveyors 12, 14 are arranged in a side-by-side parallel relationship such that a constant space or gap 16 is defined between the inside edges of the conveyors. Conveyors 12, 14 may be formed as any conventional conveyor, including conventional link-type conveyors, belt conveyors, and the like.

Conveyors 12, 14 may receive and return articles to a single conveyor 15 (as shown) or may alternatively have individual upstream and downstream conveyors if desired. FIG. 1 shows a single system conveyor 15 with an upstream and downstream diverter assemblies, which may be fixed or movable for selective operation. No limitation on the type of system external to conveyors 12, 14 should be made.

The present disclosure is not limited to any particular conveying system and has application in any system wherein articles are to be moved from a first conveyor onto a second conveyor. As mentioned above, a conventional system incorporating such oppositely moving and parallel conveyors is an accumulator system, generally shown in FIG. 1, used for accumulating and storing articles between an upstream receiving station and a downstream delivery station.

Figure 2:
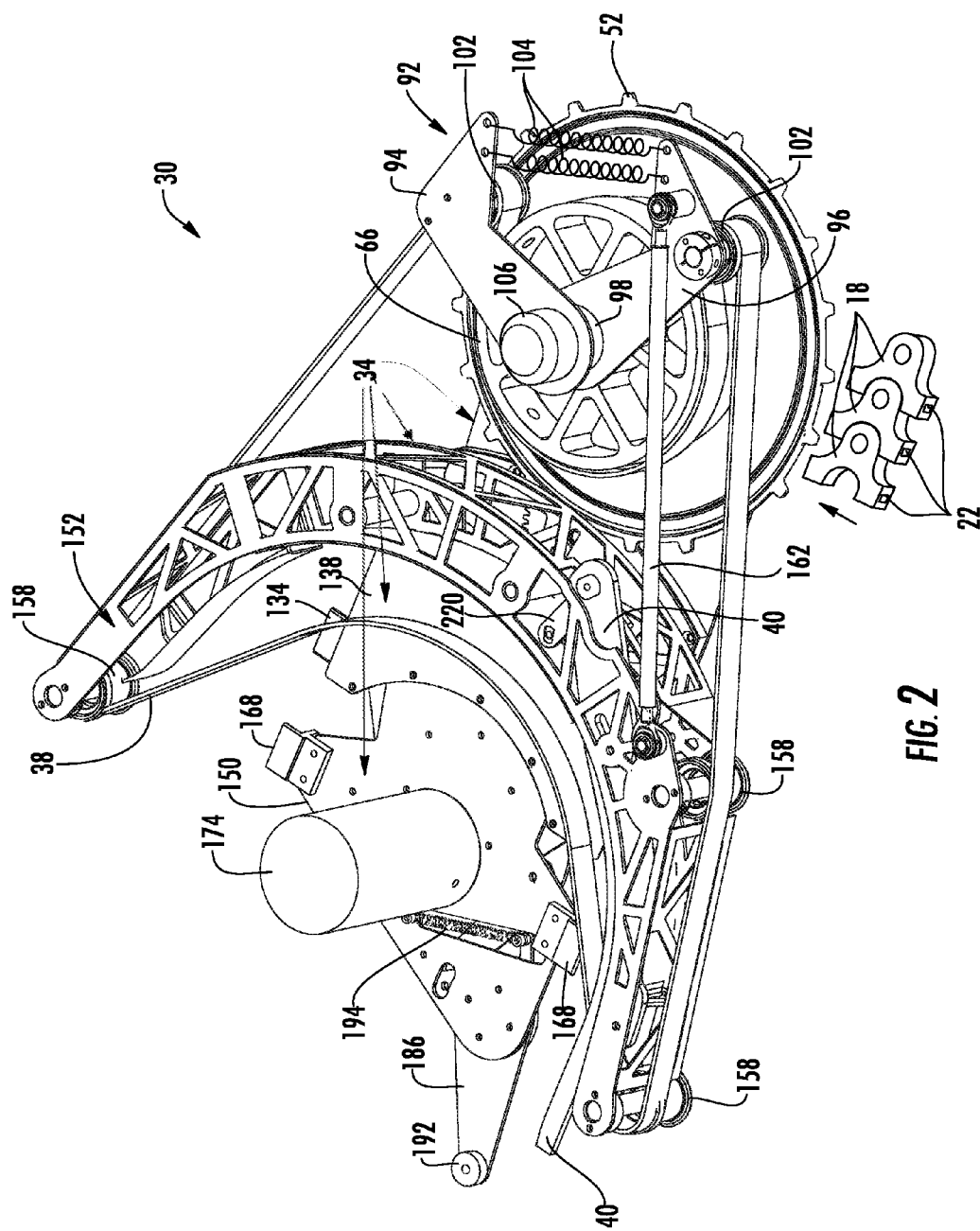
FIG. 2 is an isometric detailed view of a transfer device as in FIG. 1.
Figure 3:
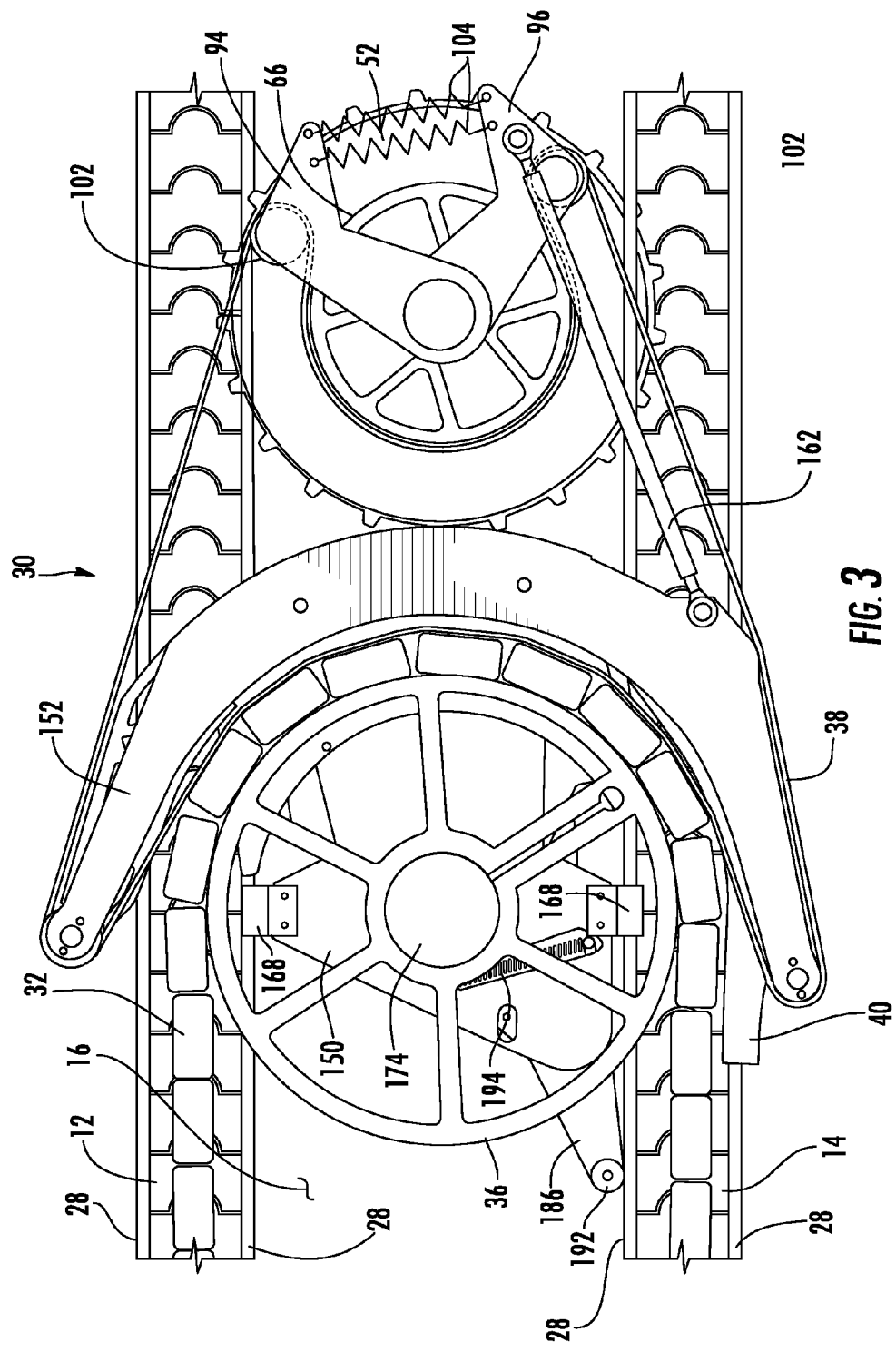
FIG. 3 is top diagrammatical view of a transfer device as in FIG. 1 along two conveyors.
Figure 4:
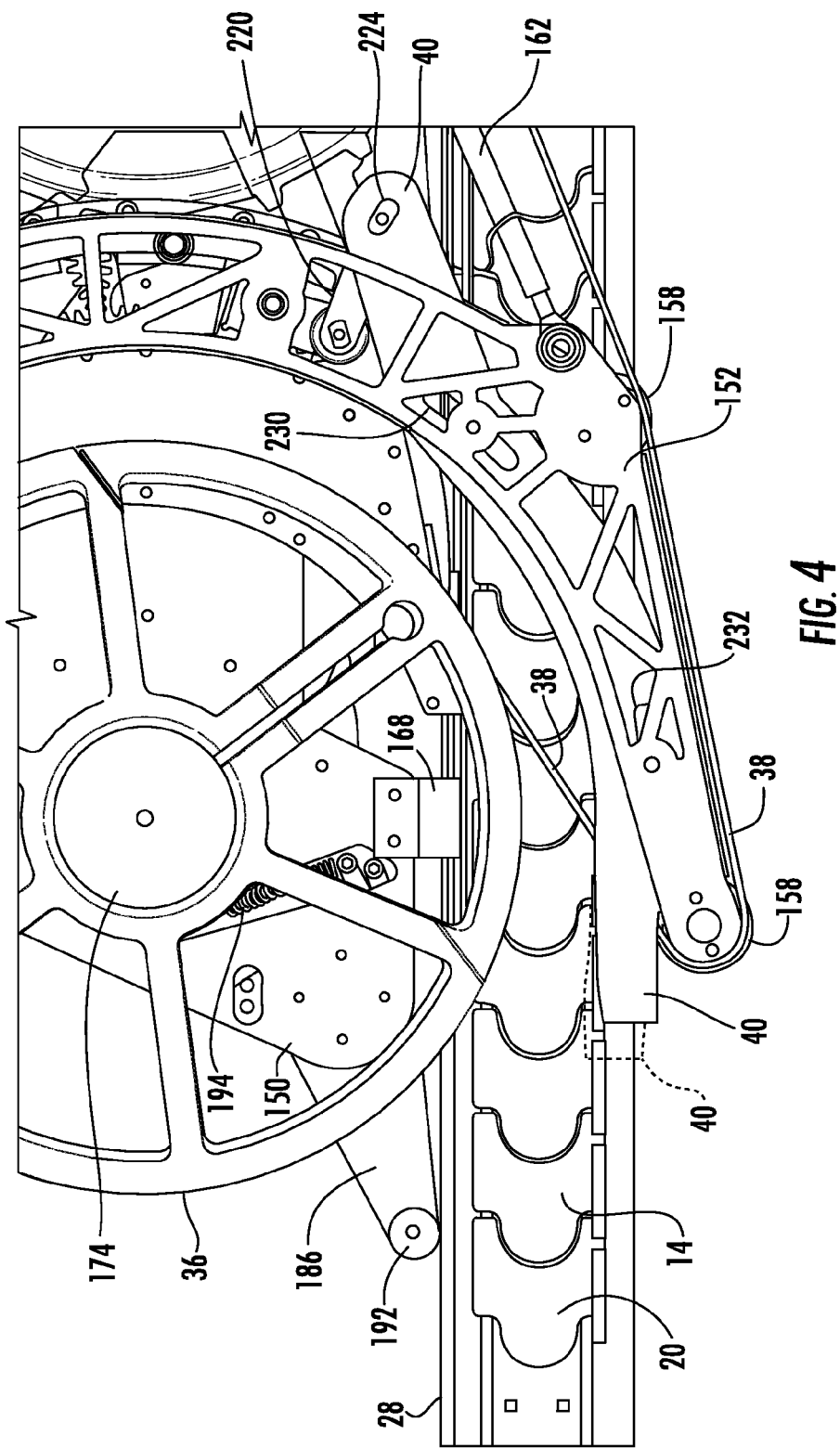
FIG. 4 is a close-up detailed view of a portion of the transfer device and conveyor of FIG. 3 in a straight portion of the conveyors with a movable guide in a retracted position.
Figure 5:
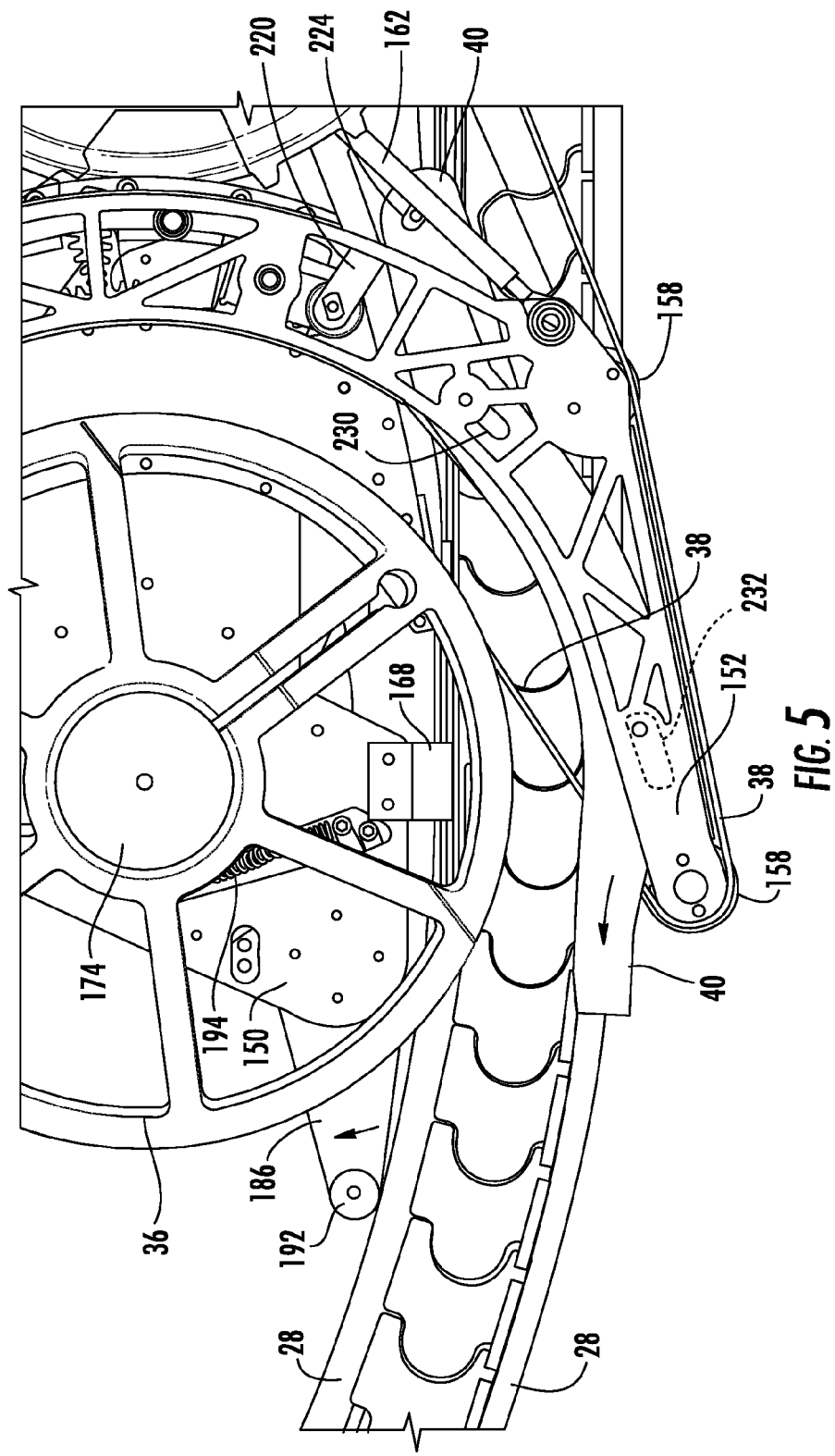
FIG. 5 is a close-up detailed view of as in FIG. 5 along a curved portion of the conveyors with the movable guide in an extended position.
Figure 6:
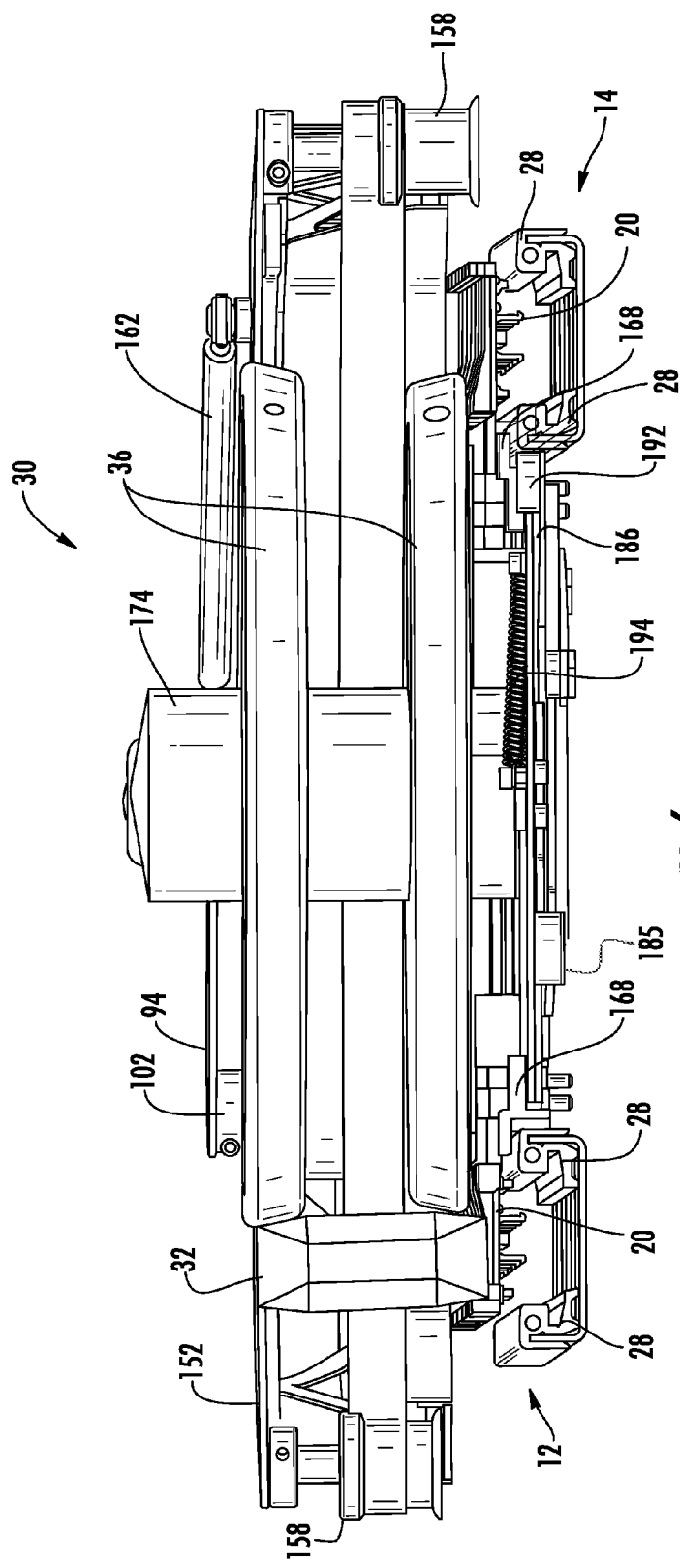
FIG. 6 is an end view, partial-sectional view of the transfer device and conveyors as in FIG. 1.
Figure 7:
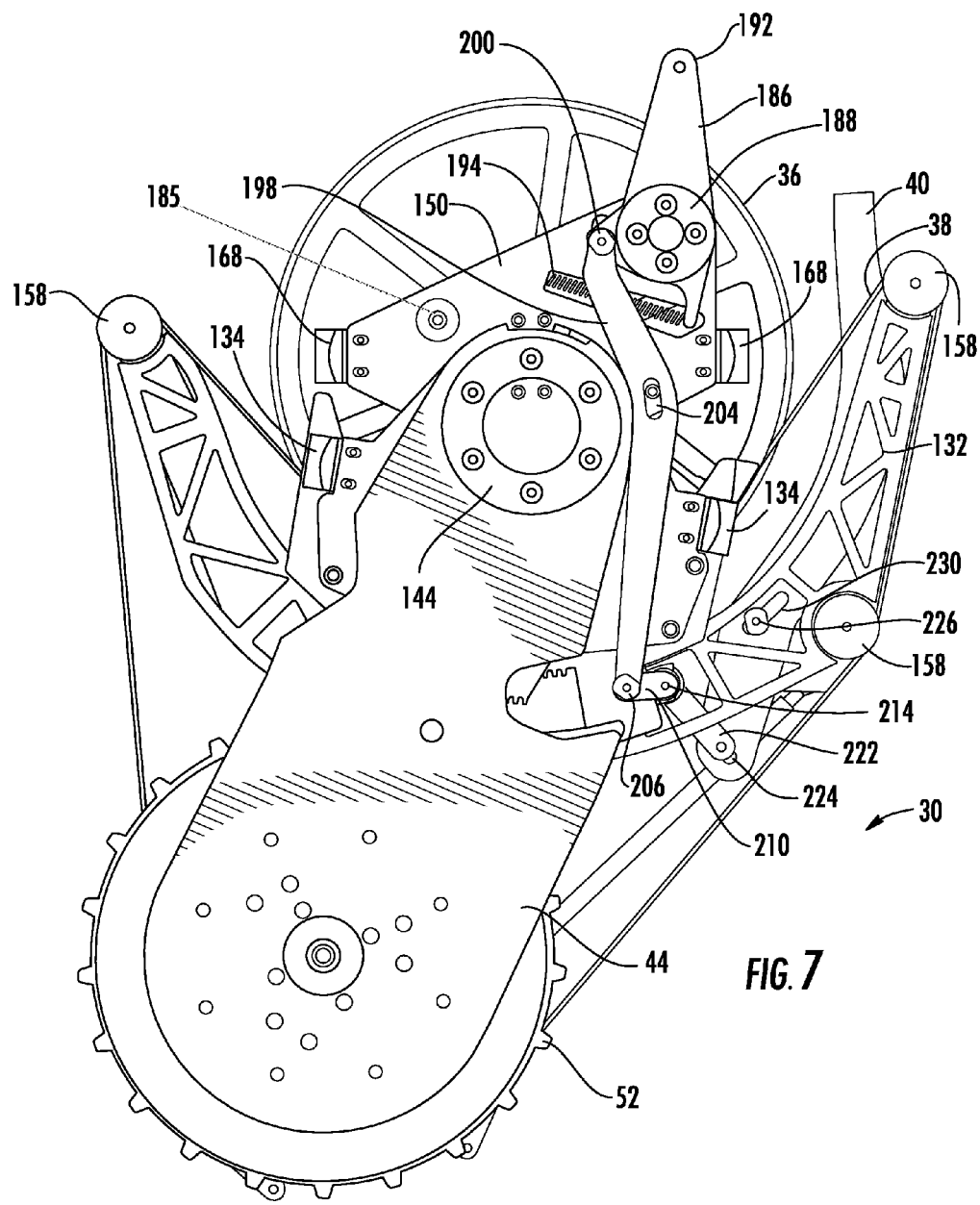
FIG. 7 is a bottom view of the transfer device of FIG. 1.

Conveyors 12, 14 may be formed of individual interconnected segments or links 18, as is well understood by those skilled in the art. Conveyors 12, 14 define an upper conveying surface, formed here by attachable platforms 20, upon which articles are placed to be conveyed by the conveyors. Each link 18 may include at least one indentation 22 or other structure (see FIG. 2) engaged by the output of a drive motor 24 (FIG. 1) or other mechanism for moving the conveyor in the conveying direction. This drive arrangement is well understood by those skilled in the art and need not be explained in great detail herein. Indentations 22 may also be engaged by structure (such as gear 48) on a transfer device that moves along conveyors 12, 14, as discussed below.

Conveyors 12, 14 are supported by any manner of frame structure generally illustrated as 26 in FIG. 1. Frame structure 26 may include any sort or number of vertical, horizontal, angled or curved members for supporting conveyors 12, 14. Guide channels 28 are attached to and supported by frame structure and define the path followed by conveyors 12, 14. Conveyors 12, 14 ride on respective guide channels 28, and space 16 is located between the respective guide channels for conveyors 12 and 14. FIG. 1 illustrates that guide channels 28 may be arranged so as to form a curved path, and may form a non-horizontal path for conveyors 12, 14. It should be understood that the path of conveyors 12 and 14 may be horizontal or non-horizontal. If non-horizontal, the path may have one or more levels of partial or complete overlap. Such conveyor path design can be readily determined by one skilled in the art according to the amount of buffering required, the amount of floor space available, the size and type of articles being handled, etc. Thus, the illustrated single overlap of FIG. 1 is but one example that could be employed according to the present disclosure.

Apparatus 10 according to the disclosure also includes a movable transfer device, generally 30, as shown in FIGS. 2-13. Transfer device 30 is disposed so as to ride along guide channels 28 and conveyors 12, 14 while extending generally across space 16 between the conveyors, as illustrated in FIG. 1. Transfer device 30 defines a transfer path for the articles 32 across gap 16 from first conveyor 12 to second conveyor 14.

Transfer device 30 includes an articulatable frame 34 made of a number of elements, described below. Frame 34 can actuate (i.e., certain elements pivot relative to each other) so that transfer device 30 can move through both straight portions and curved portions of conveyors 12, 14. Frame 34 carries other elements for assisting movement of articles 32 between conveyors 12 and 14. Such elements may include an inner guide 36 and an outer guide 38, as well as a movable guide 40 controlled by a mechanism 42 (FIG. 12) to extend the movable guide 40 in curved portions of conveyors 12, 14. Frame 34 also carries other elements for moving transfer device 30 along the conveyors, including drive wheel 44 driven by indentations 22. The structure and operation of each of these elements of transfer device 30 will be described below.

Figure 8:
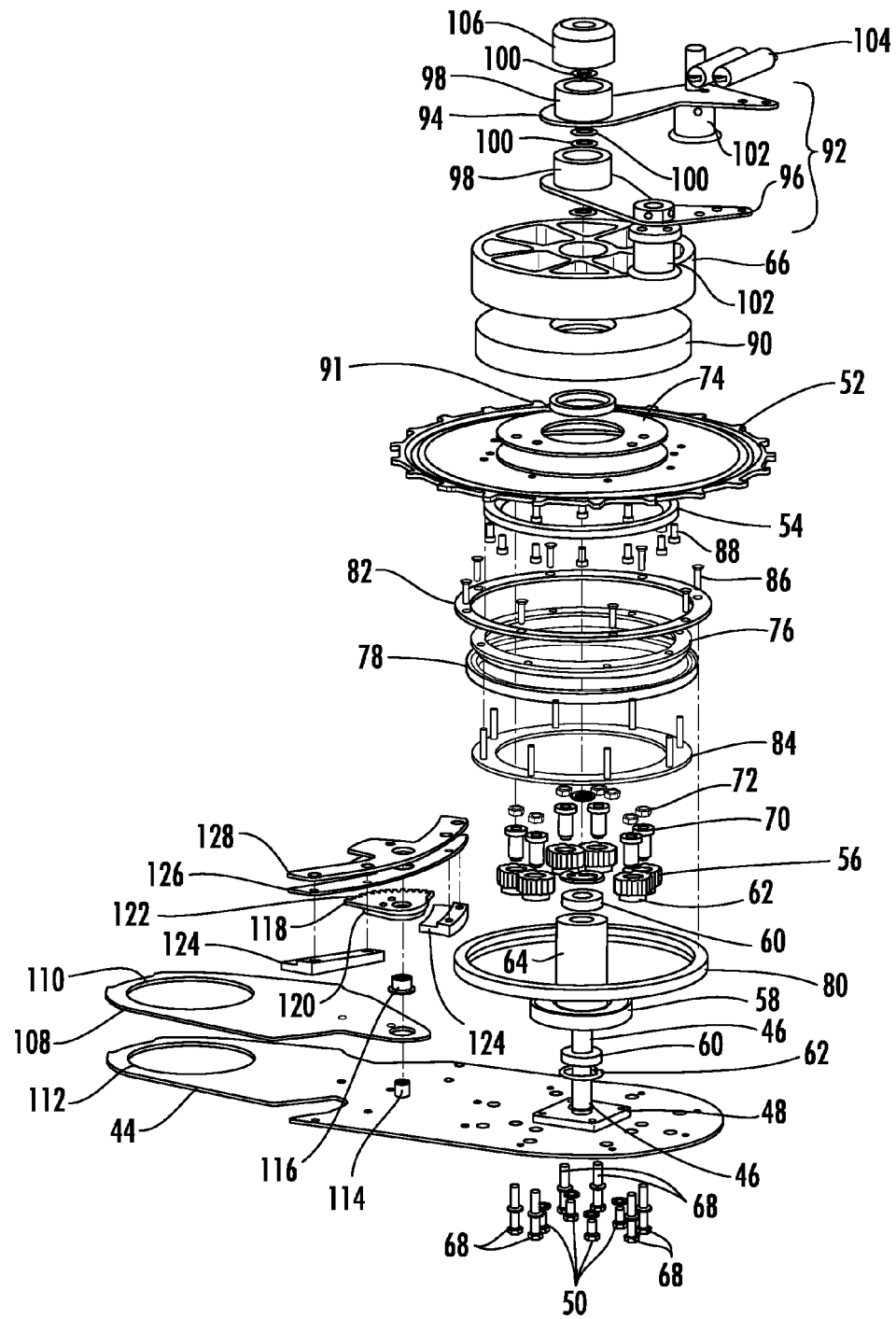
FIGS. 8-10 are exploded views of different portions of the transfer device of FIG. 1.

As shown in FIG. 8, articulatable frame 34 of transport device 30 includes a base plate 44 to which an axle 46 is attached via a mounting plate 48 and screws 50. A gear train is attached to axle 46. Drive gear 52 of the gear train is driven by indentations 22 in conveyor links 18 when a relative speed difference exists between conveyors 12 and 14. Drive gear 52 rotates freely relative to axle 46. Drive gear 52 serves as an input to transfer device 30 so as to be able to move the transfer device along conveyors 12, 14 via direct contact, and also to move outer guide 38 on the transfer device via the gear train. The gear train includes a planetary gear system including an outer, internally toothed ring gear 54 attached for rotation with drive gear 52, planetary gears 56 mounted to base plate 44, and an internal (sun) gear 58. Internal gear 58 is mounted to rotate freely around axle 46 via bearings 60 held by retainer rings 62 and a spacer shaft 64, to which internal gear 58 is non-rotatably mounted. Spacer shaft 64 is attached to a drive wheel 66 for outer guide 38 (a belt). Accordingly, when drive gear 52 is rotated due to speed differential between conveyors 12 and 14, the rotation is transferred to drive wheel 66 via gears 54, 56 and 58 and spacer shaft 54. The speed ratio between drive gear 52 and drive wheel 66 may be selected by one skilled in the art for the particular application in which apparatus 10 will be used.

Fasteners 68, shafts 70, nuts 72 and plate 74 may be used to mount planetary gears 56 to base plate 44. Bearings 76, 78 and 80, rings 82 and 84, and fasteners 86 and 88 may be used to rotatably mount drive gear 52 and ring gear 54 to base plate. A cover 90 may be provided to protect the planetary gear assembly with a shaft seal 91.

FIG. 8 also shows a tensioning mechanism 92 mounted at the distal end of axle 46. Tensioning mechanism includes two arms 94, 96 mounted to axle 46 via spacers 98 and retaining rings 100. Each arm 94, 96 carries an idler pulley 102 that defines part of the path of outer guide 38 which is mounted on transfer device 30 so as to place tension on coil springs 104 extending between arms 94, 96. A protective cap 106 may cover the top of axle 46 and the spacer 98 of arm 94.

FIG. 8 also shows a portion of the mechanism that allows the articulation between base plate 44 and other portions of transfer device 30. As illustrated, a bearing friction plate 108 is mounted on one end of base plate 44. Concentric holes 110, 112 are located in friction plate 108 and base plate 44 for receiving certain other structure, discussed below. A pivot axle 114 with a bushing 116 extend upward from plate to allow a pivot gear 118 to rotate thereon. Pivot gear has a first set of teeth 120 at a first radius from pivot axle 114 and a second set of teeth 122 at a second (larger) radius from the pivot axle. Support blocks 124, a hold down plate 126 and a bearing friction plate 128 hold pivot gear 118 in place.

Figure 9:
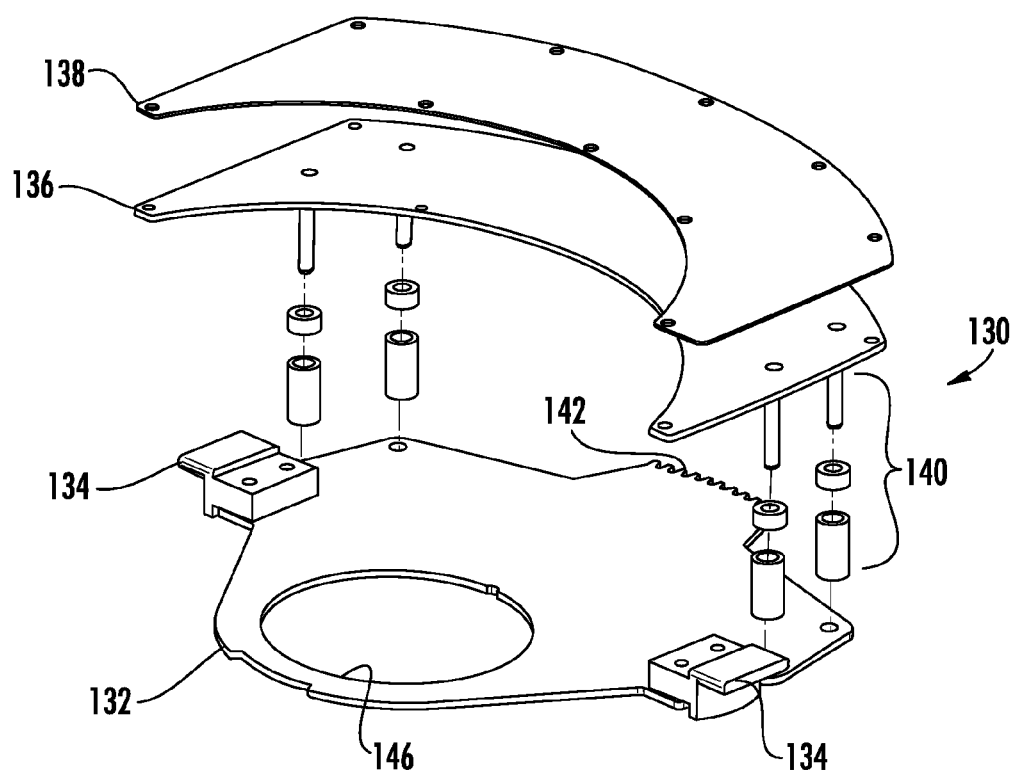

FIG. 9 shows a dead plate assembly 130 that is pivotally attached to base plate 44. As illustrated, dead plate assembly 130 includes a base plate 132, slides 134 that slide along inner guide channels 28 of conveyors 12 and 14, a lower dead plate 136 and a friction bearing upper dead plate 138, as well as mounting hardware 140 for attaching the dead plates 136, 138 to base plate 132 with some spacing so that other elements can fit in between them. Teeth 142 on base plate 132 engage teeth 120 on pivot gear 118 (FIG. 8).

Figure 10:
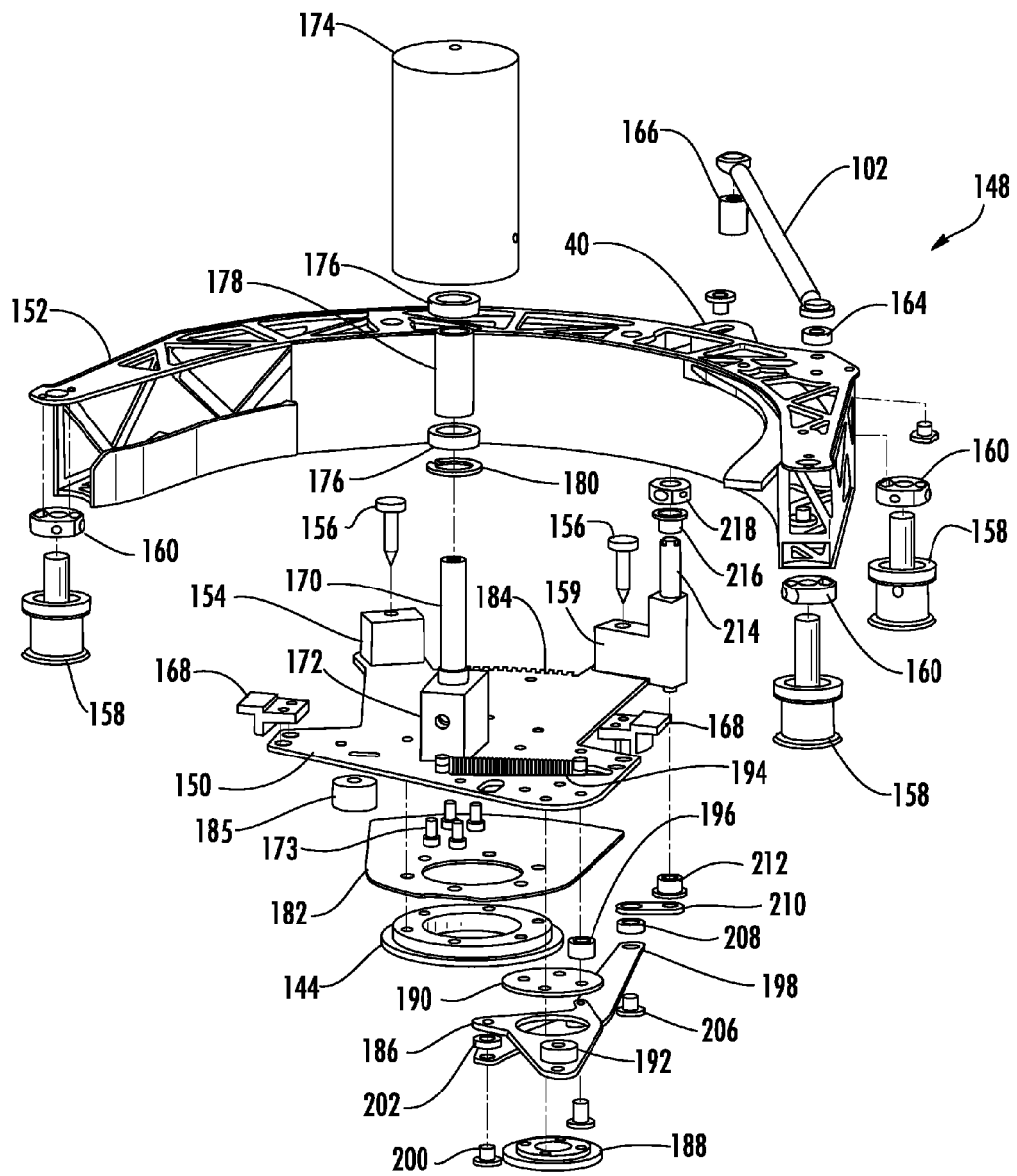
Figure 11:
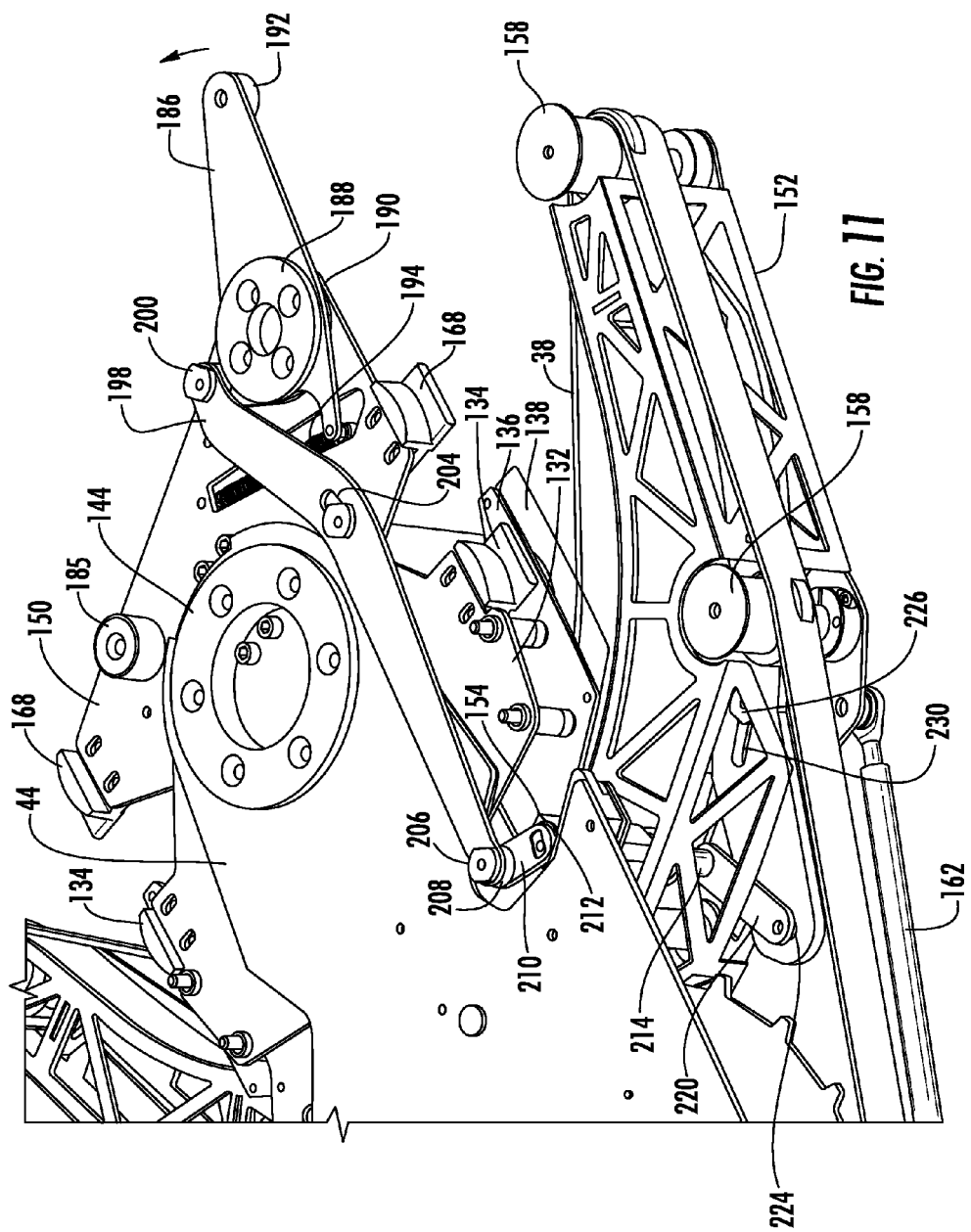
FIG. 11 is a bottom partial perspective view of the transfer device of FIG. 1, showing details of the movable guide and the components that drive the movable guide.
Figure 12:
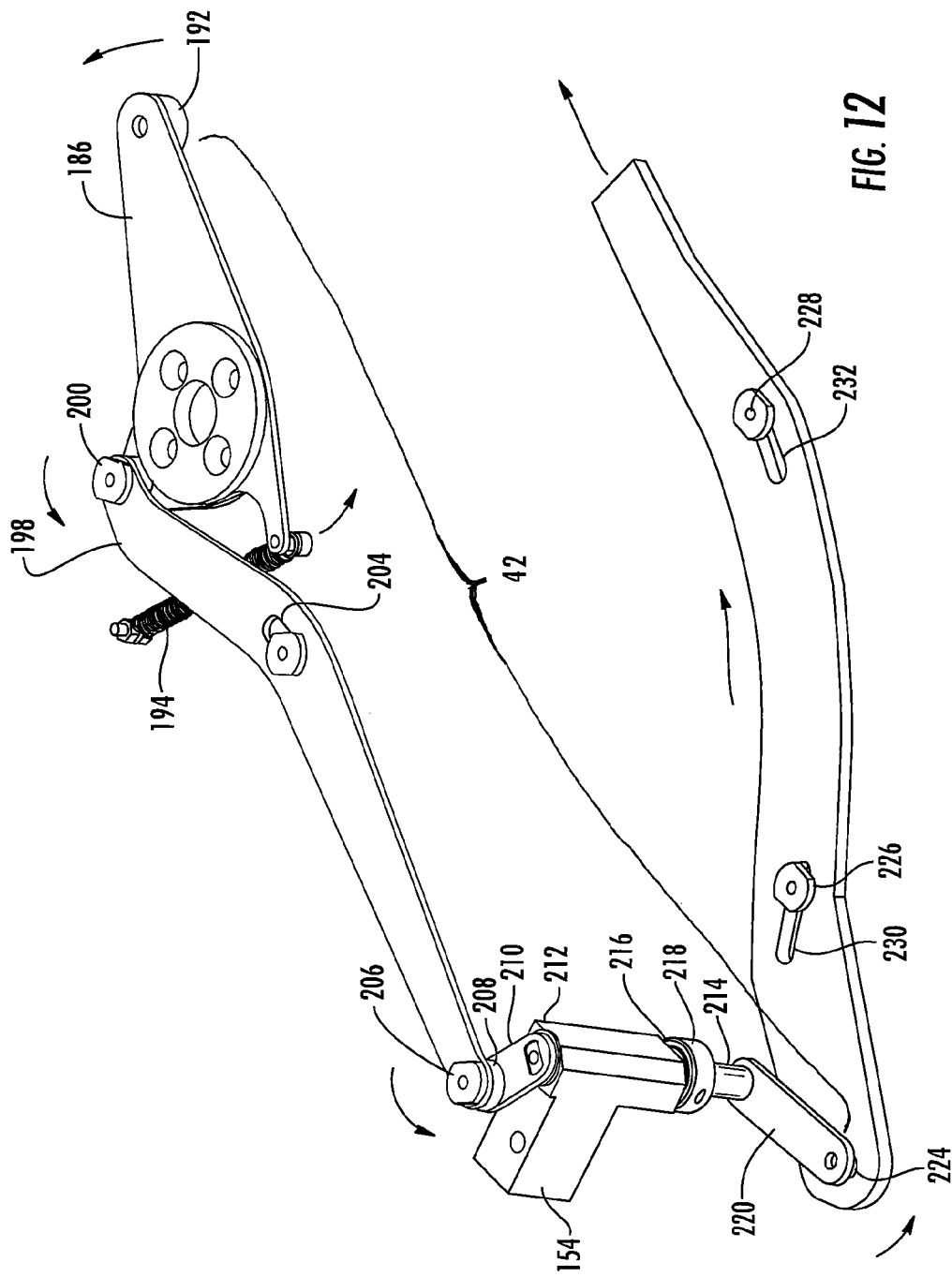
FIG. 12 is a bottom perspective view as in FIG. 11 of the components that drive the movable guide removed from the transfer device.

Dead plate assembly 130 pivots relative to base plate 44 via rotation around a pivot bearing 144 (FIG. 10). Opening 146 in base plate 132 of dead plate assembly receives inner run of pivot bearing 144, while outer run of pivot bearing 144 is attached to base plate 44. Thus, dead plate assembly 130 can pivot slightly relative to base plate 44, as guided by pivot bearing 144 and interacting teeth 142 on base plate 132 and teeth 120 on pivot gear 118. Dead plate assembly 130 pivots relative to base plate 44 around a central axis of pivot bearing 144.

Dead plate assembly 130 pivots relative to base plate 44 when transfer device 30 is in a curved portion of conveyors 12, 14, with slides 134 following the inner guide channels 28 of conveyors 12, 14. In such a curved portion, because slides 134 follow the curve, base plate 134 of dead plate assembly 130 pivots slightly relative to base plate 44 around the center of pivot bearing 144 (see FIG. 7). Having the dead plate assembly 130 pivot in such manner assists in smoother flow of articles across transfer device 30 from conveyor 12 to conveyor 14. Also, the pivoting motion allows the transfer device 30 to be sized as large as it is (thereby providing robust control of its own position and the transfer of devices) while also traversing curves.

FIG. 10 shows other elements of forward deck assembly 148 of transfer device 30 used to guide articles from conveyor 12 to conveyor 14. Forward deck assembly 148 is also pivotable relative to base plate 44 via pivot bearing 144, as described below, to further assist transfer device 30 in navigating curves in conveyors 12 and 14.

Forward deck assembly 148 includes a base plate 150 to which a curved guide frame assembly 152 is attached via mounting blocks 154 and fasteners 156. Guide frame assembly 152 assists in defining a path for articles from conveyor 12 to conveyor 14 across dead plate 138. Guide frame assembly 152 also includes structure used to route and to adjust the tension on outer guide 38, which is a belt (not shown in FIG. 8 for clarity; see FIGS. 2 and 8). Belt 38 traverses three idler pulleys 158 on guide frame assembly 152, held in place by collars or bearings 160. Belt 38 also traverses drive wheel 66 and two idler pulleys 102 on tensioning arms 94 and 96, where tension on the belt is maintained by coil springs 104. Thus, rotation of drive wheel 66 drives belt 38.

To maintain desired tension on belt 38 when transfer device 30 moves through curves, a compensator link 162 is attached at one end to guide frame assembly 152 via a spacer 164 and at another end to arm 96 of the tensioning mechanism 92 via a spacer 166. Slides 168 are mounted to base plate 150 to follow guide channels 28 of conveyors 12 and 14. As forward deck assembly 148 follows conveyors 12, 14, the deck assembly pivots back and forth relative to base plate 44 entering and exiting a curve, and compensator link 162 moves arm 96 back and forth, thereby repositioning pulley 102 on arm 96 to thereby maintain desired tension on belt 38. Such movement of arm 96 causes springs 104 to change length to maintain tension. If desired, arm 94 can be mounted to axle 46 in a fixed (non-pivotable) manner, while arm 96 is mounted in a pivotable manner so that compensator link 162 moves arm 96 and springs 104 without moving arm 94.

Inner guide 36 (not shown in FIG. 10 for clarity, see FIGS. 2 and 3) is at least one wheel mounted to rotate freely relative to base plate 150. If desired two such wheels 36 (mounted coaxially, one atop the other) may be employed for taller articles (see FIG. 6). To hold wheel 36 on base plate 150, an axle 170 is attached via a mounting block 172 and fasteners 173. Wheel 36 is mounted to axle 170, for example, via a wheel hub 174, bearings, 176, a spacer 178 and a retaining ring 180, although other structures could be used. Although wheel 36 functions as an idler, wheel 36 could also be driven, for example by way of a connection such as a belt and/or gearing (not shown) from drive gear 52 or associated driven components. Idler wheel 36 and driven belt 38 thus act as inner and outer guides to define a path between conveyor 12 and conveyor 14, with the driven belt moving the articles without creating backup or line-pressure. The size of wheel 36 may be chosen with respect to the size of articles so that sufficient spacing between the wheel and belt 38 is provided to lightly grip and move the articles. If desired two wheels (mounted coaxially, one atop the other) may be employed for taller articles.

Base plate 150 of forward deck assembly 148 is mounted via a friction plate 182 to inner race of pivot bearing 144, so as to allow the base plate to rotate freely relative to both base plate 132 of dead plate assembly 130 and the overall transfer device base plate 44. Teeth 184 on base plate 150 mesh with teeth 122 of pivot gear 118 to guide base plate 150 while pivoting. An adjustable stop 185 may be attached to base plate 150 to define a pivot limit by contacting base plate 44. The differing diameters and corresponding gear ratios of teeth 120, 122, 142 and 148 are selected such that pivotal movement of either of base plates 44 and 150 is transferred to base plate 132 of dead plate assembly 130 as transfer device 30 moves along curves defined by conveyors 12, 14. The gear ratios can be selected to match the diameter of the curves in the conveyors, with reference also to the size of the transfer device. Thus, relative pivotal movement of base plates 44 and 150 is transferred to dead plate assembly 130 at a stepped down ratio so that dead plate 138 is maintained essentially perpendicular between conveyors 12, 14 as transfer device 30 moves through a curve. This assists in maintaining the length of transfer path between the conveyors 12, 14 regardless of the position of transfer device 30 relative to a straight or curved section of the conveyors. The static distance maintains a relatively constant article conveying rate as transfer device 30 moves along the conveyors. Slides 134 and 168 also assist in maintaining the desired alignment.

Movable guide 40 is slidably attached to guide frame assembly 152. The position of movable guide 40 is controlled by a mechanism 42 which causes the guide to move when transfer device is in a curved portion of conveyors 12, 14 in a direction that extends movable guide 40 from guide frame assembly 152. Doing so assists in guiding articles from dead plate assembly 130 back to conveyor 14 by providing a longer guide surface. Use of a movable guide 40 could be useful, for example, in applications with a relatively smaller curve radius for conveyors 12, 14, that operate at a higher line speed, and/or that have articles that are taller or top heavy.

Mechanism 42 includes an arm 186 attached to forward deck assembly base plate 150 via a pivot bearing 188 and a friction bearing 190. A cylindrical follower 192 is located at one end of arm 186 for contacting a guide channel 28 of conveyor 14. A coil spring 194 is mounted in tension between base plate 150 and arm 186, with a spacer 196 in between, to urge arm 186 to rotate around pivot bearing 188 in a direction that urges follower 192 into contact with guide channel 28 of conveyor 14 and maintains such contact in a straight portion of the conveyor. Upon entering a curved portion of conveyor 14, follower 192 is driven in a direction to rotate arm 186 around pivot bearing 188 relative to base plate 150 and thereby lengthen spring 194.

Arm 186 is attached at one end to link 198 via a fastener 200 and spacer 202. Another fastener extends through a slot 204 in link 198 and is attached to base plate 150 so as to allow link 198 to slide relative to base plate 150 when arm 186 is pivoted. The other end of link 198 a connection is made via a fastener 206 and spacer 208 to one end of another (shorter) link 210. The other end of link 210 is attached via a bushing 212 to an axle 214 extending upward through mounting block 154 and guide frame assembly 152, secured by hardware such as a bushing 216 and a collar 218. Axle 214 is also connected to another short link 220. Links 210 and 220 are non-rotationally connected to axle 214 so as to rotate together as a unit relative to mounting block 154.

Link 220 is attached to one end of movable guide 40 via a bushing 222 extending through a small slot 224 in movable guide. Two additional bushings 226, 228 are attached to guide frame assembly 152 (i.e., a first section of the frame) and extend respectively though slots 230, 232. The slots are arranged so as to be generally concentric to the central axle 170 and wheel 36 of forward deck assembly 150. Accordingly, when transfer device 30 enters a curve, follower 192 (i.e., a second section of the frame) is moved relative to base plate 150 (and other items pivot as well, as noted above). The movement of follower 192 is transmitted though the various bearings, bushings, links, etc. noted above (i.e., mechanism 42) to cause movable guide 40 to be slid relative to guide frame assembly 152 from the position of FIG. 4 toward the position of FIG. 5 (also shown in dotted lines in FIG. 4). Extension of movable guide 40 to the position of FIG. 5 allows articles to be released with a direction of motion substantially aligned with the direction of motion of conveyor 14 when transfer device 30 is in a curve. Without such movement, articles could be released with a direction of movement slightly outward of the direction of movement of conveyor 14. While such arrangement is acceptable for many applications, the use of the movable guide 40 may allow for an apparatus 10 that traverses sharper curves, that buffers flow or larger or more top heavy items, and/or that moves articles at a higher conveyor speed.

Movable guide 40 includes an inner surface profile that contacts and guides articles including a curved upstream portion 234 and a substantially straight exit portion 236.

When installed in guide frame assembly 152, curved portion 234 is somewhat concentric around axle 170 with other portions of the guide frame assembly, so as to cooperate with the guide frame assembly, wheel (inner guide 36) and belt (outer guide 38) in smoothly moving articles from conveyor 12 to conveyor 14 across transfer device 30. To contact articles, at least a downstream portion of curved portion 234 should extend radially inward slightly more than related curved portions of guide frame assembly 152 and belt 38 so as to contact and influence the flow of articles. The transition from curved portion 234 to exit portion 236 should be smooth. Exit portion 236 and may be substantially tangent to the curve of curved portion 234 with reference to the center of axle 170. Such a smooth curve and substantially linear outlet allows for continuous flow through and out of transfer device 30.

It should be appreciated by those skilled in the art that various modifications and variations can be made in the present disclosure without departing from the scope and spirit of the disclosure. For example, the particular structural members described herein can take on any manner of shape or configuration. In addition, the relative pivotal movements between the components can be supported by any manner of structure and gearing arrangement. It is intended that the present disclosure include such modifications and variations as come within the scope of the appended claims and their equivalents.

I claim:

1. An apparatus for controlling the flow of articles comprising:
   a first conveyor drivable in a first direction to convey articles in the first direction;
   a second conveyor substantially parallel to the first conveyor and drivable in a second direction opposite to the first direction to convey articles in the second direction, the first and second conveyors having at least one curved portion; and
   a transfer device movable along the first and second conveyors, the transfer device having:
      a frame having a first section and a second section pivotally mounted to the first section, the second section pivotable relative to the first section along the curved portion of the first and second conveyors;
      a drive member rotatably mounted to the frame and drivingly engaged simultaneously by the first and second conveyors, the drive member being rotated relative to the frame when at least one of the first and second conveyors moves so that the transfer device travels along the first and second conveyors if a relative speed difference exists between the first and second conveyors;
      an outer guide;
      an inner guide spaced from the outer guide defining between them a transfer path across the frame between the first conveyor and the second conveyor; and
      a movable guide mounted to the frame adjacent the outer guide, the movable guide defining an exit portion of the transfer path along the second conveyor and being drivable in a direction to lengthen the transfer path when the curved portion of the first and second conveyors causes a pivoting of the second section relative to the first section.

2. The apparatus of claim 1, wherein the outer guide includes a drive belt.

3. The apparatus of claim 2, wherein the drive belt is mounted to the frame so as to contact and guide articles from the first conveyor to the second conveyor, the drive belt being driven by the drive member.

4. The apparatus of claim 3, wherein the drive belt is driven by the drive member.

5. The apparatus of claim 1, wherein the inner guide is an idler wheel.

6. The apparatus of claim 5, wherein the idler wheel is mounted to the frame so as to contact and guide articles from the first and second conveyor cooperatively with the outer guide which includes a drive belt, the transfer path defined between the drive belt and the idler wheel.

7. The apparatus of claim 1, wherein the movable guide includes an arcuate plate that engages the articles and guides the articles from the frame to the second conveyor.

8. The apparatus of claim 7, wherein the arcuate plate is movable substantially circumferentially around a center of the inner guide.

9. The apparatus of claim 7, wherein the arcuate plate has a curvature substantially concentric with a circumferential portion of a wheel of the inner guide.

10. The apparatus of claim 1, wherein the movable guide is movable substantially circumferentially around the inner guide.

11. The apparatus of claim 10, wherein the movable guide defines at least one arcuate slot therethrough substantially concentric with a circumferential portion of a wheel of the inner guide, and wherein at least one member is mounted to the first section of the frame extending through the slot, and wherein a mechanism operationally interconnects the movable guide to the second section of the frame so that pivoting of the second section of the frame relative to the first section causes the movable guide to move by sliding along the slot.

12. A transfer device for transferring a flow of articles from a first conveyor drivable in a first direction to convey articles in the first direction to a second conveyor substantially parallel to the first conveyor and drivable in a second direction opposite to the first direction to convey articles in the second direction, the first and second conveyors having at least one curved portion, the transfer device comprising:
   a frame having a first section and a second section pivotally mounted to the first section, the second section pivotable relative to the first section along the curved portion of the first and second conveyors;
   a drive member rotatably mounted to the frame and drivingly engaged simultaneously by the first and second conveyors, the drive member being rotated relative to the frame when at least one of the first and second conveyors moves so that the frame travels along the first and second conveyors if a relative speed difference exists between the first and second conveyors;
   an outer guide;
   an inner guide spaced from the outer guide defining between them a transfer path across the frame between the first conveyor and the second conveyor; and
   a movable guide mounted to the frame adjacent the outer guide, the movable guide defining an exit portion of the transfer path along the second conveyor and being drivable in a direction to lengthen the transfer path when the curved portion of the first and second conveyors causes a pivoting of the second section relative to the first section.

13. The transfer device of claim 12, wherein the outer guide includes a drive belt.

14. The transfer device of claim 13, wherein the drive belt is mounted to the frame so as to contact and guide articles from the first conveyor to the second conveyor, the drive belt being driven by the drive member.

15. The transfer device of claim 13, wherein the drive belt is driven via the drive member.

16. The transfer device of claim 12, wherein the inner guide is an idler wheel.

17. The transfer device of claim 16, wherein the idler wheel is mounted to the frame so as to contact and guide articles from the first and second conveyor cooperatively with the outer guide which includes a drive belt, the transfer path defined between the drive belt and the wheel.

18. The transfer device of claim 12, wherein the movable guide includes an arcuate plate that engages the articles and guides the articles from the frame to the second conveyor.

19. The transfer device of claim 18, wherein the arcuate plate is movable substantially circumferentially around a center of the inner guide.

20. The transfer device of claim 18, wherein the arcuate plate has a curvature substantially concentric with a circumferential portion of a wheel of the inner guide.

21. The transfer device of claim 12, wherein the movable guide is movable substantially circumferentially around the inner guide.

22. The transfer device of claim 21, wherein the movable guide defines at least one arcuate slot therethrough substantially concentric with a circumferential portion of a wheel of the inner guide, and wherein at least one member is mounted to the first section of the frame extending through the slot, and wherein a mechanism operationally interconnects the movable guide to the second section of the frame so that pivoting of the second section of the frame relative to the first section causes the movable guide to move by sliding along the slot.

\* \* \* \* \*